UNITED STATES PATENT OFFICE.

CHARLES H. GOLDING, OF VIRGINIA, NEVADA.

IMPROVED COMPOSITION FOR COATING AMALGAMATING-PANS, &c.

Specification forming part of Letters Patent No. 52,040, dated January 16, 1866.

*To all whom it may concern:*

Be it known that I, CHARLES H. GOLDING, of Virginia, in the county of Storey and State of Nevada, have invented a new and useful Composition of Matter; and I do hereby declare that the following is a full, clear, and exact description of the mode of preparing and using the same.

This composition is intended more especially for cementing fire-brick to iron and for coating amalgamating-pans to prevent the acids from corroding the iron, but may be used for other purposes.

To enable those skilled in the art to make and use my invention, I will proceed to describe the manner of preparing and using the same.

It is composed of four parts of quartz, five parts of red lead, and one part of smelted borax. The ingredients are mixed together with sufficient cold water to form a paste of the required consistency.

In cementing fire-brick to iron the composition is applied in the same manner as common mortar. The whole is then placed in an oven and slowly heated until they come to a red heat, after which they are allowed to cool.

In coating pans the scale is removed and the paste applied cold of the required thickness. It is then placed in the oven, as in the former case.

Care should be taken not to allow the blaze of the fire to come in contact with the paste while heating, as it would form metallic lead.

Having thus described my invention, what I claim as new, and desire to secure by Letters Patent, is—

Mixing the above-named ingredients in about the proportion stated and subjecting the same to heat, to form a new and useful composition of matter for various purposes.

C. H. GOLDING.

Witnesses:
H. M. MORGAN,
D. F. HODGES.